Oct. 27, 1953  H. B. DRAPEAU ET AL  2,656,982
BY-PASS THERMOSTATIC VALVE
Filed May 26, 1951  2 Sheets—Sheet 1
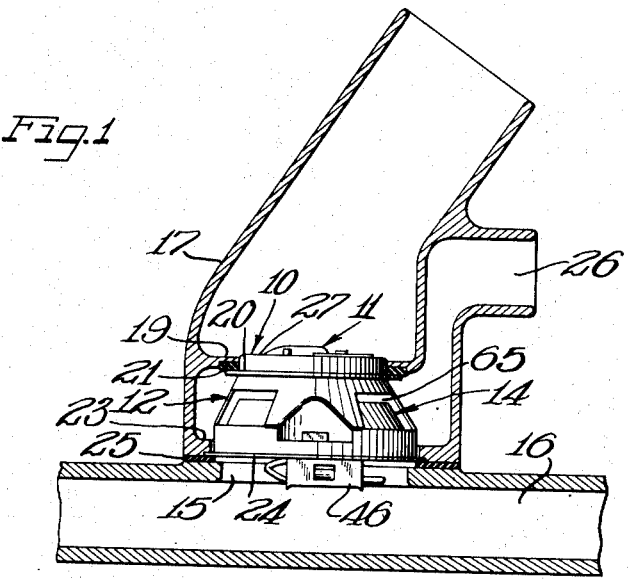
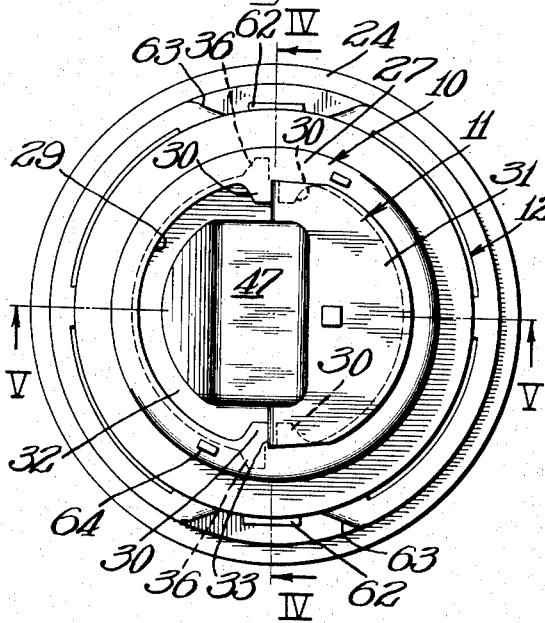
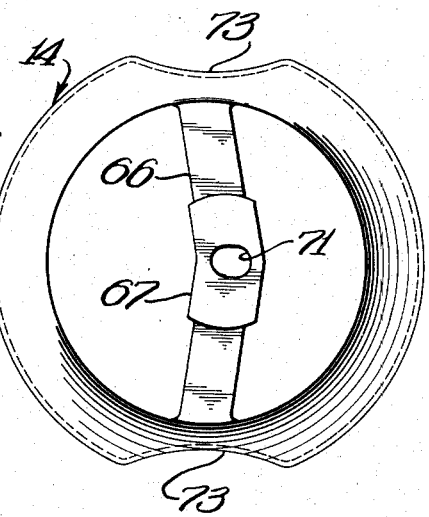
Inventors:
Harold B. Drapeau
Robert B. Wingerter
by Hill, Sherman, Meroni, Gross & Simpson Attys

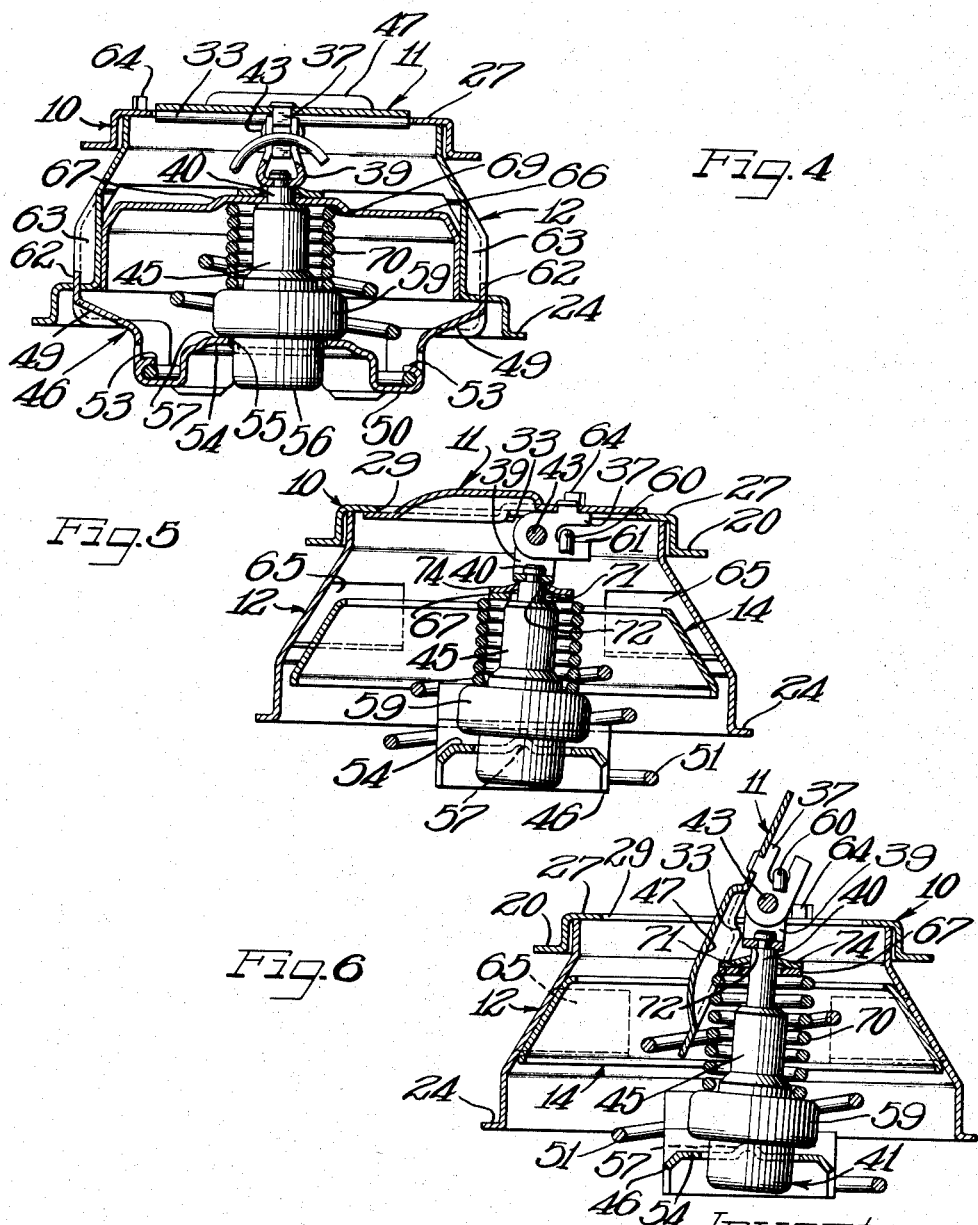

Patented Oct. 27, 1953

2,656,982

UNITED STATES PATENT OFFICE 2,656,982

BY-PASS THERMOSTATIC VALVE

Harold B. Drapeau, Oak Park, and Robert B. Wingerter, Chicago, Ill., assignors to The Dole Valve Company, Chicago, Ill., a corporation of Illinois Application May 26, 1951, Serial No. 228,392

15 Claims. (Cl. 236—34.5)

This invention relates to improvements in thermostatically operated by-pass valves, particularly adapted for use in pressurized cooling systems for internal combustion engines.

Heretofore, cooling systems of internal combustion engines have relied solely upon radiator and surface cooling capacity to cool the engine, and bellows types of thermostats, basically closed by atmospheric pressure, have been used to maintain the temperature of the engine to the desired value.

The trend in the design of cooling systems for the past few years, however, has been to pressurize the system and thus reduce the required size of radiator and the volume of coolant required to effect cooling. This has rendered the bellows type of thermostatic element, and other types of thermostatic elements affected by pressure, unsuitable for use to control the temperature of the coolant and has necessitated a complete change in the structure and theory of operation of the valve and the thermostatic element operating the valve, along with the attendant difficulties encountered in adapting the new types of thermostatic elements for operating the valves controlling the engine temperature and by-passing the coolant past the radiator.

An object of our invention is to remedy the difficulties heretofore encountered in controlling the temperatures of pressurized cooling systems by providing a simple and efficient positively acting, thermostatically operated by-pass valve unaffected by pressure in the cooling system.

Another object of our invention is to provide a novel form of thermostatically operated by-pass valve for pressurized cooling systems of internal combustion engines, utilizing an extensible power type of thermostatic element to control the circulation of cooling fluid through the radiator, and a floating by-pass valve operable to by-pass the cooling fluid past the radiator until the temperature of the fluid reaches a predetermined value.

A still further object of our invention is to provide a thermostatically operated by-pass valve particularly adapted for use in the pressurized cooling systems of internal combustion engines including a power type of thermostatic element and valve controlling the circulation of fluid through the system, and a simple and novel form of annular by-pass valve floatingly mounted on the extensible part of the thermostatic element and closing the by-pass ports upon opening of the valve to circulate fluid through the system.

Another and more specific object of our invention is to provide a new and improved form of thermostatically operated by-pass valve structure for the pressurized cooling systems of internal combustion engines wherein the circulation of fluid through the radiator is controlled by a butterfly valve and the by-pass is controlled by an annular valve slidably guided within the valve casing.

Still a further object of our invention is to provide a new and improved form of thermostatically operated by-pass valve mechanism particularly adapted for pressurized cooling systems of internal combustion engines, wherein the flow of fluid through the cooling system is controlled by a power type of thermostat having a piston extensible therefrom to open a flow control valve and allow the flow of coolant through the radiator, and wherein the valve controlling the by-pass of fluid past the radiator is floatingly mounted on the piston and is spring-urged to follow the piston upon extension thereof to close the by-pass ports of the valve, upon opening of the flow control valve controlling the flow of coolant through the radiator.

These and other objects of our invention will appear from time to time as the following specification proceeds and with reference to the accompanying drawings wherein:

Figure 1 is a view in side elevation of a valve constructed in accordance with our invention, showing the valve in position in the head of an internal combustion engine with the main flow control valve closed and the by-pass valve open;

Figure 2 is a top plan view of the valve shown in Figure 1;

Figure 3 is a top plan view of the annular by-pass valve element;

Figure 4 is a vertical sectional view taken substantially along line IV—IV of Figure 2;

Figure 5 is a vertical sectional view taken substantially along line V—V of Figure 2; and Figure 6 is a view somewhat similar to Figure 4 but showing the butterfly valve in an open position and the by-pass valve in a closed position.

In the embodiment of our invention illustrated in the drawings, the valve is shown as including an annular valve casing 10 for a butterfly valve 11, extending along and mounted on the top of a frusto-conical casing 12 for an associated by-pass valve 14.

The valve may be mounted over an opening 15 in the cylinder head of an internal-combustion engine and communicating with a cooling passageway or water jacket 16 in the cylinder head. The valve is shown as being secured in place over the opening 15, by means of a hose connection fitting 17 suitably secured to the top of the cylinder head. The fitting 17 is herein shown as having an annular wall portion 19 engaging a flanged portion 20 of the casing 10 and sealed thereto as by a sealing ring or gasket 21. The fitting 17 likewise has an inwardly extending lower annular wall 23 engaging a flange 24 of the by-pass casing 12, and sealed to the cylinder head as by gasket 25. A by-pass connection 26 is provided in the fitting 17, to by-pass cooling liquid past the radiator when the valve 11 is closed.

The casing 10 may be made from a metallic stamping, stamped from a sheet or plate of any suitable material and is herein shown as having a flat upper annular portion 27, the inner margin of which forms a valve opening 29, and also having a cylindrical wall portion terminating into the annular flanged portion 20, forming a sealing shoulder held in sealing engagement with the annular wall 19 by the packing ring or gasket 21.

The frusto-conical by-pass casing 12 may likewise be made from a metallic stamping and tabs 64, 64 may form a continuation of its upper wall portion and extend through corresponding slots in the annular portion of the casing 10, and be secured thereto, as by soldering.

The valve opening 29 is of a generally circular form, divided into two halves, at the junction of which are spaced inwardly extending nibs 30, 30 (see Figure 2). The spaces between said nibs form two aligned slots disposed in a straight line which defines generally the pivotal axis of the butterfly valve 11.

The valve element 11 may likewise be made from a metallic stamping, and may be similar to that shown in the Brown Patent No. 2,493,336, dated January 10, 1950. As herein shown, said valve comprises two vertically offset flat wing portions 31 and 32 extending in opposite directions from the center of the valve in parallel relation with respect to each other. These wing portions are connected together by an intermediate section 33 extending generally perpendicularly to the wing portions 31 and 32. The height of the intermediate section 33 is determined by the thickness of the annular valve portion of the casing defining the valve opening, and is such that one wing portion 31 is disposed on the top side of the valve opening 29 and the other is disposed on the bottom side of the valve opening.

When the valve is in a closed position, as shown in Figures 1 and 2, it will extend beyond the edge of the valve opening and half of the valve will overlap the top edge of the annular portion 27 and the other half of the valve will underlap the bottom edge thereof, to close off the flow of fluid through the opening 29.

Two ears 36, 36 are herein shown as extending oppositely from the wing portion 32 of the valve 11, adjacent the right angle portion 33 thereof. These ears extend laterally beyond the margins of the valve opening 29 and are herein shown as abutting the bottom of the annular portion 27 defining the valve opening. The marginal edges of said ears come into engagement with the bottom of the annular portion 27 upon complete opening of the valve, to retain the valve in position.

The valve 11 may be inserted through the slots formed between the ears 30, 30 from the bottom of the casing by first inserting the wing portion 31 through said slots until the portion 33 comes into engagement therewith. The valve may then be pivoted upon the right angled portion 33 into a closed position.

The valve 11 is pivoted to its open and closed positions through a connecting lug or ear 37, shown as being secured to and depending from the wing 31, and as extending transversely of the pivotal axis of said valve element. A yoke 39, mounted on the upper end of a piston 40 of a temperature-responsive element 41 is shown as being connected to the inner portion of the ear 37 as by a pivotal pin 43. The yoke 39 is herein shown as extending along opposite sides of the ear 37 and as being snapped or sprung on a grooved upper end portion of the piston 40 and as being mounted thereon for free movement with respect thereto about the axis of said piston.

The piston 40 is shown as being extensible from a cylinder 45 of the temperature sensitive element 41, herein shown as extending through and as being rockingly mounted adjacent its lower end in a saddle 46, as will hereinafter more clearly appear as this specification proceeds. The pivotal axis of the pin 43 is offset laterally from the pivotal axis of the valve element 11 to effect pivotal movement of said valve element to an open position as the piston 40 is extended from the cylinder 45. The valve element 11 is provided with an embossed portion 47, the underside of which forms a recess in the bottom of the wing portion 31, to allow full pivotal movement of said valve element with respect to the temperature sensitive element 41.

The saddle 46 is shown in Figures 4 and 5 as being of a strap-like form in transverse section with upwardly extending end portions 49, 49 having integral tabs 62, 62 extending upwardly therefrom and through suitable slots formed in the bosses of inwardly recessed portions 63, 63 of the casing 12. Said tabs may be suitably secured to said casing, as by soldering. The saddle 46 also has a recessed intermediate portion 50, forming a seat for a return spring 51, secured thereto as by inwardly stamped retaining tabs 53, 53, bent inwardly into engagement with the bottom coil of said spring. The saddle 46 also has an upwardly dished central portion 54 having a central opening 55 therein to receive a base 56 of the temperature sensitive element 41. The upwardly dished central portion 54 of the saddle 46 is upset adjacent the margins of the central opening 55 at diametrically opposed points, as by stamping, to form rounded bearing nibs 57, 57 upon which rockingly rests a ring 59, encircling the enlarged base 56 of the temperature sensitive element 41, enabling said temperature sensitive element to rock and follow the ear 37 upon opening and closing of the valve.

The return spring 51 is herein shown as being a generally conical spiral coiled spring of a relatively few convolutions, converging in diameter from the lower to the upper end thereof. The spring 51 terminates into an integral upper hook portion 60, extending at right angles to the coils of the spring through an outwardly opening slot 61 formed in the ear 39. The hook 60 reacts against the slot 61 at a point offset laterally and outwardly from the pivotal axis of the valve element 11 and maintains said valve element closed except when opened by extension of the piston 40 from the cylinder 45, upon predetermined increases in temperature of the coolant.

The temperature-responsive element 41 may be of a well known form of power type of extensible temperature-responsive element, which is not affected by pressure, and utilizes a preformed body contained in the base 56 of the casing to extend the piston 40 from the cylinder 45 with a relatively high degree of pressure. Such a temperature-responsive element is disclosed in Vernet Patent No. 2,259,846, dated October 21, 1941. The preformed body may also be composed of high molecular weight alkalines or similar substances intimately mixed together with a finely divided conducting material contained in a casing, as disclosed in Vernet Patent No. 2,368,181, dated January 30, 1945.

Referring now to the frusto-conical by-pass casing 12 and by-pass valve 14 therein, the by-pass casing 12 is shown as having a plurality of ports 65, 65 extending along and through the frusto-conical wall thereof and forming communicating passageways from the by-pass passageway 26 to the inside of said casing and the water jacket of the cylinder head, when the by-pass valve 14 is open.

The by-pass valve 14 is shown in Figure 3 as being of generally annular formation, preferably formed by stamping, with a frusto-conical wall conforming to the frusto-conical wall of the casing 12. A bridge 66 extends across the open top of the valve 14 and is shown as being in the form of a flat V, inclined from opposite sides of the open portion of said valve with respect to a diametral line extending through the valve to offset the central portion of said bridge from the center of said valve. This offset is sufficient to conform to the offset position of the saddle 46 and thermostatic element 41 with respect to the center of the frusto-conical by-pass casing 12, positioning the vertical axis of said thermostatic element past the pivotal axis of the butterfly valve 11, to afford leverage to readily open said valve (see Figures 5 and 6).

The bridge 66 has an enlarged central portion 67, herein shown as being pressed upwardly from the bottom of said bridge, to form a downwardly opening recess 69, forming a seat for a valve operating spring 70. The enlarged central portion 67 of the bridge 66 has an elongated aperture 71 extending therethrough, loosely fitting over the piston 40 of the temperature sensitive element 41, and allowing free movement of said piston with respect to said by-pass valve element, upon movement of the butterfly valve 11 into its open and closed positions.

The by-pass valve element 14 likewise has two oppositely disposed recessed portions 73, 73, which may be stamped in the wall thereof and which have interengaging slidable engagement with the inner walls of the inwardly embossed portions 63, 63 of the by-pass casing 12. The inwardly embossed portions 63, 63 of the by-pass casing 12, thus form a slidable guide for said by-pass valve, guiding said valve for vertical movement within said by-pass casing.

The underside of the yoke 39 projects beyond the margins of the piston 40 and forms a stop 72 for the by-pass valve 14. Said stop is slidably engaged by an arcuate upper engaging surface of a spacer 74. The spacer 74 is loosely mounted on the piston 40 between the top surface of the enlarged portion 67 of the bridge 66 and the bottom of the stop 72. Said spacer serves to hold the by-pass valve 14 in the open position shown in Figures 4 and 5 when the butterfly valve 11 is closed by abutting engagement with the stop 72, and allows said by-pass valve to follow the piston 40 when moving in a direction to open the butterfly valve element 11.

The spring 70 is seated at its end opposite the bridge 66 on the ring 59 encircling the base 56 of the temperature-responsive element 41. Said spring maintains the arcuate engaging surface of the spacer 74 in engagement with the stop 72 and positively moves the by-pass valve element 14 with the piston 40, upon extension thereof, until said by-pass valve element has come into engagement with the inner wall of the frusto-conical by-pass casing 12 over the ports 65, 65 thereof, to block the passage of fluid through said ports.

It should be noted with regard to Figure 6, that the by-pass valve 14 is moved into position to cover the ports 65, 65 solely by the action of the compression spring 70, and that the ports 65, 65 are fully closed prior to full opening of the butterfly valve 11 to the position shown in Figure 6. In this position, the spacer 74 is free from the stop 72, and the by-pass valve element 14 is entirely free from the piston 30, and in effect floats with respect thereto. As the coolant circulating through the engine water jackets and radiator cools, the expansible material within the base 56 of the temperature-responsive element 41 will contract, allowing the return spring 51 to pivot the butterfly valve 11 in a closing direction and engage the stop 72 with the spacer 74 upon taking up the freedom of movement or slack between the stop 72 and the arcuate engaging surface of the spacer 74. When this slack is taken up the return spring 51 will continue to pivot the butterfly valve 11 in a closing direction, and at the same time will move the by-pass valve 14 downwardly against the spring 70, to uncover the ports 65 and allow the coolant to by-pass therethrough.

The return spring 51 is, therefore, stronger than the spring 70, and the spring 70 need only be strong enough to urge the by-pass valve 14 to follow the piston 40 upon extensible movement thereof, into position to close the ports 65, 65, and to positively hold the frusto-conical wall of the valve 14 into engagement with said ports, when the valve 11 is open.

It may be seen from the foregoing that the by-pass valve 14 is floatingly carried on the piston 39 and that said piston, while holding said by-pass valve open by the abutting engagement of the stop therewith, has no direct function in opening or closing said by-pass valve, closing being effected by the spring 70 and opening being by the return spring 51, by engagement of the stop 72 with the arcuate surface of the floating spacer 74.

It may still further be seen that a novel and improved form of thermostatically operated by-pass valve having a temperature-responsive element unaffected by pressure has been provided which is particularly adapted for use in pressurized cooling systems for internal combustion engines, and that the by-pass valve 14, guided within the by-pass casing and floating on the piston 40, forms an effective floating closure means for the by-pass ports 65, 65, closing said ports and holding them closed by the action of the spring 70, and opening said ports upon retraction of the piston 40 effected by the return spring 51, during the operation of closing the butterfly valve 11.

It will be understood that modifications and variations may be effected without departing from the scope of the novel concepts of the present invention.

We claim as our invention:

1. In a thermostatically operated by-pass valve structure, an annular valve casing having a wall, a by-pass port in said wall, an annular by-pass valve guided within said wall into position to cover and uncover said port, a temperature-responsive element within said casing including an extensible member, a loose and slidable connection between said by-pass valve element and said extensible member, spring means urging said by-pass valve element to follow said extensible member upon extensible movement thereof, and return spring means retractibly moving said extensible member and said by-pass valve element into position to open said by-pass port.

2. In a thermostatically operated by-pass valve structure, an annular valve casing having a wall, a by-pass port in said wall, a temperature-responsive element controlling the passage of fluid through the open ends of said casing and including an extensible member, an annular by-pass valve element within said casing and conforming to the wall thereof, an interengaging slidable guiding connection between said wall and said by-pass valve element, a loose and slidable mounting for said by-pass valve element on said extensible member, and spring means urging said by-pass valve element into abutting engagement with said extensible member for travel therewith for a portion of the length of travel thereof.

3. In a thermostatically operated by-pass valve structure particularly adapted for pressurized cooling systems of internal combustion engines, an annular valve casing having a wall, a valve element associated with an open end of said casing, an extensible temperature-responsive element operatively connected with said valve and mounted within said casing, a by-pass port in the wall of said casing, and a by-pass valve element guided within said casing and slidably mounted on said temperature-responsive element to close said by-pass port upon movement of said temperature-responsive element in position to open said first mentioned valve element, and means yieldably biasing said by-pass valve element into engagement with said extensible temperature-responsive element for travel therewith to close said by-pass port and to accommodate further movement of said temperature-responsive element to fully open said first mentioned valve element.

4. In a thermostatically operated by-pass valve of the class described, an annular valve casing having a wall, a by-pass port in said wall, a valve element associated with an open end of said casing, a temperature-responsive element mounted in said casing and including an extensible member, an operative connection between said extensible member and valve element, and a by-pass valve element guided within said casing for movement along the wall thereof and floatingly mounted on said extensible member to control the passage of fluid through said by-pass port depending upon the position of said extensible member and said first mentioned valve, and means yieldably biasing said by-pass valve element to follow said extensible member upon movement thereof in a direction to open said first mentioned valve element, to close said by-pass port and to accommodate further movement of said temperature-responsive element to fully open said first mentioned valve element.

5. In a thermostatically operated by-pass valve of the class described including an annular valve casing having a vertically extending wall, a valve element associated with an open end of said casing, an extensible temperature-responsive element rockingly mounted within said casing and including a cylinder having a piston extensible therefrom, and a pivotal connection from said piston to said valve element for opening the same, the improvements comprising a by-pass port in said wall, a by-pass valve element guided within said casing for movement along the wall thereof to cover and uncover said by-pass port, a floating mounting for said by-pass valve element on said piston, a stop on said piston, and a spring encircling said piston and seated within said by-pass valve element and holding said by-pass valve element into engagement with said stop and moving said by-pass valve element into position to cover said by-pass port upon extensible movement of said piston to open said first mentioned valve element.

6. In a thermostatically operated by-pass valve structure of the class described, an annular valve casing having a vertically extending wall, a valve element associated with an open end of said casing to control the passage of fluid therethrough, a by-pass port in the wall of said casing, a by-pass valve element conforming to said wall and guided thereby to move into positions to cover and uncover said by-pass port, a saddle secured to and extending across the bottom of said casing, a temperature-responsive element rockingly mounted thereon and including a cylinder rockingly engaging said saddle and a piston extensible therefrom, a pivotal connection between the free end of said piston and said first mentioned valve element, a spring seated in said saddle and connected with said first mentioned valve element to return the same to a closed position, and said by-pass valve element being floatingly mounted on said piston for movement independently of said piston into position to cover said by-pass ports upon extension of said piston from said cylinder.

7. In a thermostatically operated by-pass valve structure, an annular valve casing having a vertically extending wall having a by-pass port therein, a valve element associated with an open end of said casing to control the passage of fluid therethrough, a saddle extending across and secured to the opposite end of said casing from said valve element, a temperature-responsive element including a cylinder rockingly engaging said saddle and a piston extensible therefrom and operatively connected with said valve element, a return spring seated in said saddle and connected with said valve element, an annular by-pass valve element slidably mounted on said piston to cover and uncover said by-pass port and having guiding engagement with the wall of said casing, a stop on said piston, and a spring encircling said cylinder and piston and engaging said by-pass valve element and holding said by-pass valve element in engagement with said stop when said piston is in a retracted position and upon extension thereof until closure of said by-pass port by said by-pass valve element.

8. A thermostatically operated by-pass valve structure comprising an annular valve casing having a frusto-conical wall, a by-pass port in said wall, a frusto-conical by-pass valve element slidably guided within the wall of said casing, a temperature-responsive element within said casing including a member extensible upon predetermined temperature rises, a loose and slidable connection between said by-pass valve element and said extensible member, spring means urging said by-pass valve element to follow said extensible member upon extensible movement thereof, and return spring means retractibly moving said extensible member and moving said by-pass valve element into position to open said by-pass port by abutting engagement with said extensible member.

9. A thermostatically operated by-pass valve structure comprising an annular valve casing having a frusto-conical wall, a by-pass port in said wall, a frusto-conical by-pass valve element slidably guided within the wall of said casing, an interengaging slidable guiding connection between said wall and by-pass valve element, a temperature-responsive element within said casing and including a member extensible upon predetermined temperature rises, said by-pass valve element being loosely and slidably mounted on said extensible member and having abutting engagement therewith, spring means urging said by-pass valve element into abutting engagement with said extensible member, and return spring means operative to retractibly move said extensible member upon predetermined reductions in temperature and to move said by-pass valve element into position to open said by-pass port.

10. In a thermostatically operated valve structure of the class described, an annular valve casing having a frusto-conical wall having a by-pass port therein, a valve element associated with an open end of said casing and controlling the passage of fluid therethrough, a generally frusto-conical by-pass valve guided within the wall of said casing and movable into position to cover and uncover the by-pass port therein, a temperature-responsive element carried within said casing and including an extensible member operatively connected with said first mentioned valve element, and spring means engageable with said by-pass valve element and urging said by-pass valve element to follow said extensible member upon extension thereof and close said by-pass port upon opening of said first mentioned valve element.

11. In a thermostatically operated by-pass valve of the class described, an annular valve casing having a generally frusto-conical wall having a by-pass port therein, a pivoted valve element associated with an open end of said casing, a generally frusto-conical valve element guided within the wall of said casing for movement into position to open and close said by-pass port, a temperature-responsive element rockingly mounted within said casing and including an extensible member operatively connected with said first mentioned valve element to open the same, a loose connection between said frusto-conical by-pass valve element and said extensible member, and spring means operatively connected with said by-pass valve element and urging said by-pass valve element to follow said extensible member upon extensible movement thereof, to close said by-pass port.

12. In a thermostatically operated by-pass valve structure particularly adapted for pressurized cooling systems of internal combustion engines, an annular valve casing having a vertically extending generally frusto-conical wall having a port therein, a butterfly valve element associated with an open end of said casing and controlling the passage of fluid therethrough, a generally frusto-conical valve element conforming generally to the wall of said casing and guided therein to cover and uncover said port, a saddle extending across the opposite end of said casing from said butterfly valve element, a temperature-responsive element seated in said saddle and including a cylinder having a piston extensible therefrom, a pivotal connection between said piston and butterfly valve element, a floating connection between said by-pass valve element and said piston allowing relative movement between said piston and by-pass valve element, a stop on said piston, spring means engaging said by-pass valve element with said stop and urging said by-pass valve element to move with said piston for a portion of the length of travel thereof to close said by-pass port prior to full opening of said butterfly valve.

13. A thermostatically operated by-pass valve structure comprising an annular valve casing having a frusto-conical wall, a by-pass port in said wall, a valve element associated with an open end of said casing, said casing having inwardly pressed portions in the frusto-conical wall thereof, a generally frusto-conical valve element guided within the wall of said casing and having recessed portions slidably engaging said inwardly pressed wall portions of said casing, a temperature-responsive element for moving said first mentioned valve element into an open position and spring means operatively connected with said by-pass valve element and moving said by-pass valve element into position to cover said by-pass port upon movement of said first mentioned valve into an open position.

14. A thermostatically operated by-pass valve structure comprising an annular valve casing having a frusto-conical wall, a by-pass port in said wall, a butterfly valve element associated with an open end of said casing, a generally frusto-conical by-pass valve conforming to the inside of the wall of said casing, a temperature-responsive element rockingly mounted within said casing and including an extensible member, a pivotal connection between said extensible member and said butterfly valve element, a slidable connection between said by-pass valve element and said extensible member, spring means urging said by-pass valve element to follow said extensible member, upon extension thereof, and guide means formed in the wall of said casing and slidably engaged by said by-pass valve element to guide said by-pass valve element into its open and closed positions including a plurality of inwardly pressed wall portions of said casing and corresponding interengaging inwardly pressed wall portions of said by-pass valve element.

15. A thermostatically operated by-pass valve structure of the class described comprising an annular valve casing having a frusto-conical wall, a by-pass port in said wall, a butterfly valve associated with an open end of said casing, a generally frusto-conical valve element movable within said casing, a temperature-responsive element rockingly mounted within said casing and including an extensible member, a pivotal connection between said extensible member and said butterfly valve element, a stop on said extensible member, a loose and floating connection between said frusto-conical by-pass valve element and said extensible member, an abutment member spaced between said by-pass valve element and stop and loosely mounted on said extensible member and having an arcuate engaging face engageable with said stop, a spring engaging said abutment member with said stop and urging said by-pass valve element to follow said piston upon extensible movement thereof, and a slidable guiding connection between the frusto-conical wall of said casing and said by-pass valve element including inwardly embossed wall portions on said casing and corresponding interengaging recessed wall portions on said by-pass valve element.

HAROLD B. DRAPEAU.
ROBERT B. WINGERTER.

References Cited in the file of this patent

UNITED STATES PATENTS

| Number | Name | Date |
|---|---|---|
| 1,223,078 | Lammert | Apr. 17, 1917 |
| 2,265,586 | Vernet | Dec. 9, 1941 |
| 2,323,533 | Giesler | July 6, 1943 |
| 2,569,359 | Vellinga | Sept. 25, 1951 |

FOREIGN PATENTS

| Number | Country | Date |
|---|---|---|
| 457,078 | Great Britain | Nov. 20, 1936 |